US012753047B2

(12) United States Patent
Kubota

(10) Patent No.: US 12,753,047 B2
(45) Date of Patent: Oct. 6, 2026

(54) LANDING-DOOR SWITCH CIRCUIT

(71) Applicant: Mitsubishi Electric Corporation, Tokyo (JP)

(72) Inventor: Takehiko Kubota, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 524 days.

(21) Appl. No.: 18/286,257

(22) PCT Filed: Apr. 22, 2021

(86) PCT No.: PCT/JP2021/016240
§ 371 (c)(1),
(2) Date: Oct. 10, 2023

(87) PCT Pub. No.: WO2022/224389
PCT Pub. Date: Oct. 27, 2022

(65) Prior Publication Data
US 2024/0199381 A1 Jun. 20, 2024

(51) Int. Cl.
*B66B 13/14* (2006.01)

(52) U.S. Cl.
CPC .................................. *B66B 13/143* (2013.01)

(58) Field of Classification Search
CPC .......... B66B 13/143; B66B 13/22; B66B 3/00
See application file for complete search history.

(56) References Cited

U.S. PATENT DOCUMENTS

| | | | | |
|---|---|---|---|---|
| 5,721,403 A * | 2/1998 | Hoppie | B66B 5/0087 187/277 |
| 7,353,914 B2 * | 4/2008 | Deplazes | B66B 13/22 187/249 |
| 8,292,038 B2 * | 10/2012 | McCarthy | B66B 13/22 187/249 |
| 9,758,347 B2 * | 9/2017 | Dudde | B66B 9/00 |
| 10,146,189 B2 * | 12/2018 | Rogers | G05B 9/03 |

(Continued)

FOREIGN PATENT DOCUMENTS

| | | |
|---|---|---|
| JP | 2000-128453 A | 5/2000 |
| WO | 2005/092761 A2 | 10/2005 |

(Continued)

OTHER PUBLICATIONS

International Search Report and Written Opinion mailed on Jul. 6, 2021, received for PCT Application PCT/JP2021/016240, filed on Apr. 22, 2021, 8 pages including English Translation.

*Primary Examiner* — Rina I Duda
(74) *Attorney, Agent, or Firm* — XSENSUS LLP

(57) ABSTRACT

A landing-door switch circuit according to the present disclosure includes an upper-car safety circuit, an upper-car auxiliary circuit, a lower-car safety circuit, and a lower-car auxiliary circuit. The upper-car safety circuit and the lower-car safety circuit connect excitation coils of switching devices of a power supply for driving an upper car and a lower car, respectively, and a power supply, and include main circuits in which landing-door switches are connected in series, and first connection units and third connection units branched from the main circuits. The upper-car auxiliary circuit and the lower-car auxiliary circuit include a second connection unit and a fourth connection unit on the lower car and the upper car, respectively, to bypass the landing-door switches.

8 Claims, 7 Drawing Sheets

(56) References Cited

U.S. PATENT DOCUMENTS

| | | | | |
|---|---|---|---|---|
| 10,745,243 | B2 * | 8/2020 | Geisshüsler | B66B 1/3492 |
| 2005/0194217 | A1 | 9/2005 | Smith et al. | |
| 2018/0237261 | A1 * | 8/2018 | Herkel | B66B 5/0031 |
| 2019/0322490 | A1 * | 10/2019 | Hovi | B66B 13/146 |

FOREIGN PATENT DOCUMENTS

| | | | |
|---|---|---|---|
| WO | 2013/145144 | A1 | 10/2013 |
| WO | 2017/187498 | A1 | 11/2017 |

* cited by examiner

LANDING-DOOR SWITCH CIRCUIT

CROSS-REFERENCE TO RELATED APPLICATION

This application is based on PCT filing PCT/JP2021/016240, filed Apr. 22, 2021, the entire contents of which are incorporated herein by reference.

TECHNICAL FIELD

The present disclosure relates to a landing-door switch circuit to be applied to a single-shaft double-car elevator.

BACKGROUND ART

Generally, the elevator is required by law to be a machine that cannot lift or lower its car unless all entrance and exit doors of the car and the hoistway are closed. (Japanese domestic law: Building Standards Law and its Enforcement Order, Article 129-9)

Therefore, a landing-door switch circuit is traditionally used, in which switches provided for all landing doors are connected in series to a switching device. A contact of the switching device connected to a hoist motor is closed when all the doors are closed by the coil of the switching device being excited.

Meanwhile, a single-shaft double-car elevator with multiple cars, upper and lower, in a single hoistway is proposed. In such an elevator, due to its structural limitations, the lower car cannot travel to or above the floor where the upper car exists, and the upper car cannot travel to or below the floor where the lower car exists. However, even when a landing door is open on a floor to which one of the two cars cannot travel, the conventional switching circuit does not allow both of the two cars to travel.

Patent Document 1 discloses a double-car elevator which, when one of the two cars lands on a floor and a landing door on that floor is open, bypasses a switch provided for the landing door on that floor by using a landing detection switch. In this double-car elevator, even when the landing door is open on the floor where one car lands, the other car can still travel because the landing-door switch on the floor is bypassed and, as a result, electric power is supplied to the hoist motor.

PRIOR ART DOCUMENTS

Patent Document

[Patent Document 1] Japanese Unexamined Patent Application Publication No. 2000-128453

SUMMARY OF THE INVENTION

Problem to be Solved by the Invention

However, in the double-car elevator described in Patent Document 1, when a landing door is opened on a floor other than the floor on which one car lands and, even if the landing on which the door is opened is a landing of a floor to which the other car cannot travel, the other car is not allowed to travel.

The present disclosure is made in view of the above problem and aims to provide, for a double-car elevator which prevents cars from traveling when a landing door is open, a landing-door switch circuit which allows one car to continue traveling even when a landing door is open on a floor to which the one car cannot travel due to the existence of the other car.

Means for Solving Problem

A landing-door switch circuit according to the present disclosure to be applied for an elevator system includes an upper car and a lower car in a single hoistway and a plurality of landing doors for passage between the upper car or the lower car and landings provided for respective floors, the landing-door switch circuit including: an upper-car safety circuit including an upper-car main circuit connecting a power supply and an upper-car coil which is an excitation coil provided for a switching device of an upper-car power supply for driving the upper car, and including a plurality of landing-door switches corresponding to the respective landings, connected in series between the upper-car coil and the power supply, the landing-door switches each turning to ON state when a landing door is in a closed state and turning to OFF state when the landing door is in an open state, and first connection units branched from the upper-car main circuit correspondingly to the respective landings where the landing-door switches are provided; an upper-car auxiliary circuit connected at one end to the upper-car coil or the power supply and including at the other end a second connection unit provided for the lower car to be electrically connected to one of the first connection units when the lower car faces one of the landings, wherein the upper-car auxiliary circuit bypasses the landing-door switches on the floor where the lower car exists and the floors below that floor when the one of the first connection units and the second connection unit are electrically connected; a lower-car safety circuit including a lower-car main circuit connecting the power supply and a lower-car coil which is an excitation coil provided for a switching device of a lower-car power supply for driving the lower car, and including a plurality of landing-door switches corresponding to the respective landings, connected in series between the lower-car coil and the power supply, and third connection units branched from the lower-car main circuit correspondingly to the respective landings where the landing-door switches are provided; and a lower-car auxiliary circuit connected at one end to the lower-car coil or the power supply and including at the other end a fourth connection unit provided for the upper car to be electrically connected to one of the third connection units when the upper car faces one of the landings, wherein the lower-car auxiliary circuit bypasses the landing-door switches on the floor where the upper car exists and the floors above that floor when the one of the third connection units and the fourth connection unit are electrically connected.

Effects of the Invention

According to the present disclosure, for a double-car elevator which prevents cars from traveling when a landing door is open, a landing-door switch circuit can be provided which allows one car to continue traveling even when a landing door is open on a floor to which the one car cannot travel due to the existence of the other car.

EMBODIMENTS FOR CARRYING OUT THE INVENTION

Embodiment 1

An elevator system with a landing-door switch circuit according to Embodiment 1 will be described on the basis of drawings.

Figure 1:
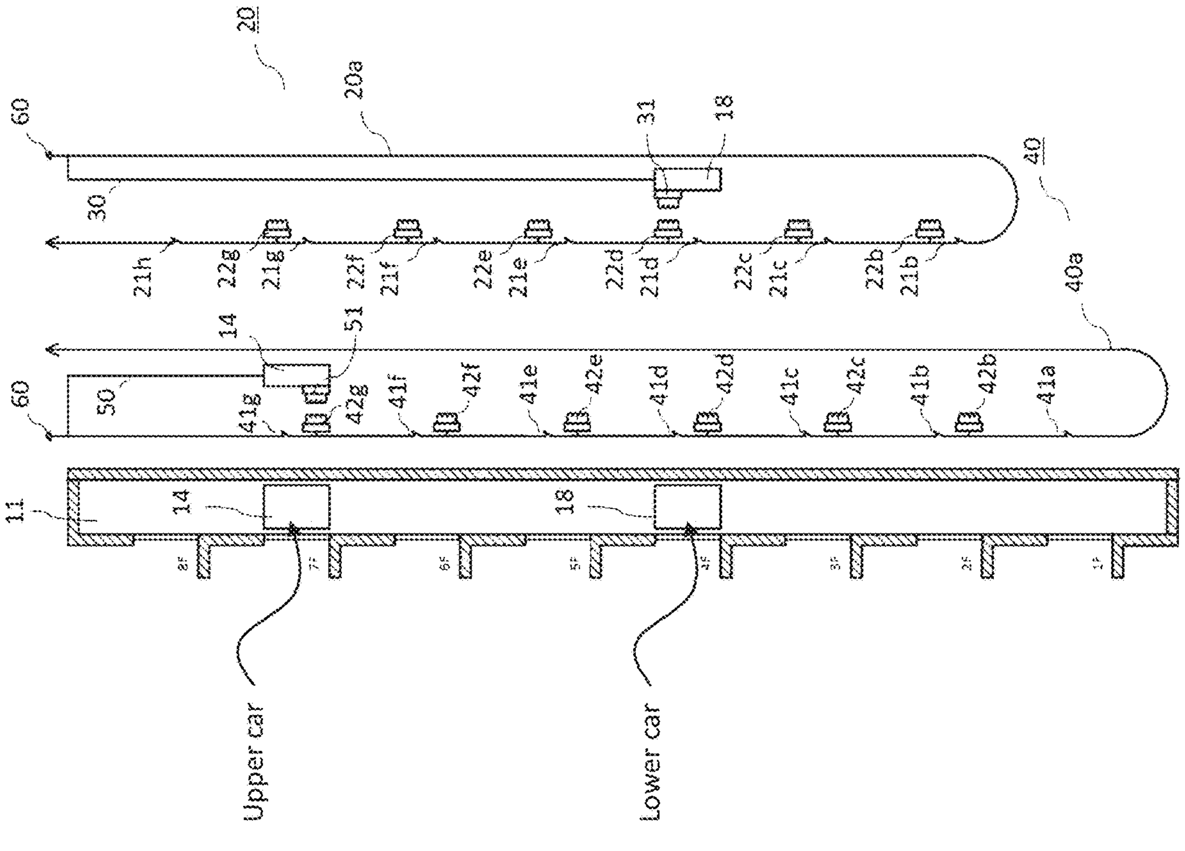
FIG. 1 shows a schematic diagram of an elevator system with a landing-door switch circuit according to Embodiment 1.

First, a configuration of the landing-door switch circuit and the elevator system will be described using FIGS. 1 to 3. FIG. 1 shows a schematic diagram of the elevator system with the landing-door switch circuit according to Embodiment 1. In the following description, an elevator system installed in an eight-story building, having the first floor (1F) to the eighth floor (8F) shown in FIG. 1, is taken as an example.

The elevator system according to the present embodiment is a single-shaft double-car elevator having an upper car 14 and a lower car 18 in a single hoistway 11. This elevator system includes a plurality of landing doors for passage between the upper car 14 or the lower car 18 and the landings provided for the respective floors. This elevator system also includes a landing-door switch circuit configured such that the upper car 14 and the lower car 18 cannot travel when a landing door is open.

The landing-door switch circuit includes an upper-car safety circuit 20 and an upper-car auxiliary circuit 30, which are circuits for the upper car 14, and a lower-car safety circuit 40 and a lower-car auxiliary circuit 50, which are circuits for the lower car 18.

The upper-car safety circuit 20 includes an upper-car main circuit 20*a* and a plurality of first connection units 22*b* through 22*g*. The upper-car main circuit 20*a* is connected at one end to a power supply 60 and at the other end to an excitation coil 23*b* and an excitation coil 24*b*, not shown in FIG. 1. The excitation coil 23*b* and the excitation coil 24*b* are excitation coils provided for a switching device of an upper-car hoist drive power supply, which is an upper-car power supply, and these excitation coils are upper-car coils. The excitation coil 23*b*, described in detail later, is an excitation coil of a main contact 23*a* of a switching device provided between a three-phase AC power supply 61 and an upper-car hoist motor 75 which are used for operating the elevator system. The excitation coil 24*b* is an excitation coil of a main contact 24*a* of a switching device provided between the three-phase AC power supply 61 and an upper-car hoist brake coil 77. The switching device with the main contact 23*a* and the switching device with the main contact 24*a* are switching devices of the upper-car hoist drive power supply to drive the upper car 14.

A second floor upper-car landing-door switch 21*b*, a third floor upper-car landing-door switch 21*c*, a fourth floor upper-car landing-door switch 21*d*, a fifth floor upper-car landing-door switch 21*e*, a sixth floor upper-car landing-door switch 21*f*, a seventh floor upper-car landing-door switch 21*g*, and an eighth floor upper-car landing-door switch 21*h* are connected in series to the upper-car main circuit 20*a* in order from the closest to the power supply 60. In the following description, they are simply referred to as the upper-car landing-door switch(es) 21 unless specifically distinguished. The upper-car landing-door switches 21 are provided for the respective landings, and the codes from "b" to "h" correspond to the floors of the landings from the second floor to the eighth floor, respectively.

Each of the upper-car landing-door switches 21 turns to ON state when the landing door at the landing is in a closed state and turns to OFF state when the landing door at the landing is in an open state. In the present embodiment, a normally-closed contact with a positive-break contact is used.

The first connection units 22 are branched from the upper-car main circuit 20*a* correspondingly to the respective landings where the upper-car landing-door switches 21 are provided, and are receivers of a contactless power supply system in the present embodiment.

The first connection units 22 are each branched from the upper-car main circuit 20*a* at a position more distant from the power supply 60 than the upper-car landing-door switch 21 provided for each landing. A first connection unit 22*b* on the second floor, a first connection unit 22*c* on the third floor, a first connection unit 22*d* on the fourth floor, a first connection unit 22*e* on the fifth floor, a first connection unit 22*f* on the sixth floor, and a first connection unit 22*g* on the seventh floor are provided in the present embodiment. The codes from "b" to "g" correspond to the respective floors of the landings from the second floor to the seventh floor, where the upper-car landing-door switches 21 are also provided. In the following description, they are simply referred to as the first connection unit(s) 22 unless specifically distinguished.

The upper-car auxiliary circuit 30 is connected at one end to the power supply 60 and has a second connection unit 31 at the other end. The second connection unit 31 is a transmitter of the contactless power supply system provided for the lower car 18. When the lower car 18 faces one of the landings, the first connection unit 22 there and the second connection unit 31 are electrically connected. When the first connection unit 22 and the second connection unit 31 are connected, the upper-car auxiliary circuit 30 bypasses the upper-car landing-door switches 21 of the upper-car safety circuit 20 of the floor where the lower car 18 exists and the floors below that floor.

For example, when the lower car 18 stops on the fourth floor as shown in FIG. 1, the first connection unit 22*d* and the second connection unit 31 are electrically connected. Therefore, the upper-car landing-door switch 21*d*, the upper-car landing-door switch 21*c*, and the upper-car landing-door switch 21*b*, which are the upper-car landing-door switches 21 on or below the fourth floor where the lower car 18 exists, are bypassed by the upper-car auxiliary circuit 30.

Thus, even when a landing door opens on the fourth floor where the lower car 18 has stopped and the second floor or the third floor below the fourth floor, thereby turning the upper-car landing-door switches 21 to OFF State, electric power is supplied to the excitation coil 23*b* and the excitation coil 24*b* from the power supply 60 via the upper-car auxiliary circuit 30, so that the upper car 14 can continue to travel.

Next, the lower-car safety circuit 40 and the lower-car auxiliary circuit 50 will be described. The lower-car safety circuit 40 and the lower-car auxiliary circuit 50 have substantially the same configurations as the upper-car safety circuit 20 and the upper-car auxiliary circuit 30, respectively.

The lower-car safety circuit 40 includes a lower-car main circuit 40*a* and a plurality of third connection units 42*b* through 42*g*. The lower-car main circuit 40*a* is connected at one end to the power supply 60 and at the other end to an excitation coil 43*b* and an excitation coil 44*b*, not shown in FIG. 1. The excitation coil 43*b* and the excitation coil 44*b* are excitation coils provided for switching devices of a lower-car hoist drive power supply, which is a lower-car power supply, and these excitation coils are lower-car coils. The excitation coil 43*b*, described in detail later, is an excitation coil of a main contact 43*a* of a switching device provided between the three-phase AC power supply 61 and a lower-car hoist motor 85. The excitation coil 44*b* is an excitation coil of a main contact 44*a* of a switching device provided between the three-phase AC power supply 61 and a lower-car hoist brake coil 87. The switching device with the main contact 43*a* and the switching device with the main contact 44*a* are switching devices of the lower-car hoist drive power supply to drive the lower car 18.

A seventh floor lower-car landing-door switch 41*g*, a sixth floor lower-car landing-door switch 41*f*, a fifth floor lower-car landing-door switch 41*e*, a fourth floor lower-car landing-door switch 41*d*, a third floor lower-car landing-door switch 41*c*, a second floor lower-car landing-door switch 41*b*, and a first floor lower-car landing-door switch 41*a* are connected in series to the lower-car main circuit 40*a* in order from the closest to the power supply 60. In the following description, they are simply referred to as the lower-car landing-door switch(es) 41 unless specifically distinguished. The lower-car landing-door switches 41 are provided for the respective landings, and the codes from "a" to "g" correspond to the floors of the landings from the first floor to the seventh floor, respectively.

Each of the lower-car landing-door switches 41 turns to ON state when the landing door at the landing is in a closed state and turns to OFF state when the landing door at the landing is in an open state, which is the same as with the upper-car landing-door switches 21. In the present embodiment, a normally-closed contact with a positive-break contact is used.

The third connection units 42 are branched from the lower-car main circuit 40*a* correspondingly to the respective landings where the lower-car landing-door switches 41 are provided, and are receivers of a contactless power supply system in the present embodiment.

The third connection units 42 are each branched from the lower-car main circuit 40*a* at a position more distant from the power supply than the lower-car landing-door switch 41 provided for each landing. A third connection unit 42*b* on the second floor, a third connection unit 42*c* on the third floor, a third connection unit 42*d* on the fourth floor, a third connection unit 42*e* on the fifth floor, a third connection unit 42*f* on the sixth floor, and a third connection unit 42*g* on the seventh floor are provided in the present embodiment. The codes from "b" to "g" correspond to the respective floors of the landings from the second floor to the seventh floor, where the lower-car landing-door switches 41 are also provided. In the following description, they are simply referred to as the third connection unit(s) 42 unless specifically distinguished.

The lower-car auxiliary circuit 50 is connected at one end to the power supply 60 and has a fourth connection unit 51 at the other end. The fourth connection unit 51 is a transmitter of the contactless power supply system provided for the upper car 14. When the upper car 14 faces one of the landings, the third connection unit 42 there and the fourth connection unit 51 are electrically connected. When the third connection unit 42 and the fourth connection unit 51 are connected, the lower-car auxiliary circuit 50 bypasses the lower-car landing-door switches 41 of the lower-car safety circuit 40 on the floor where the upper car 14 exists and the floors above that floor.

Figure 2:
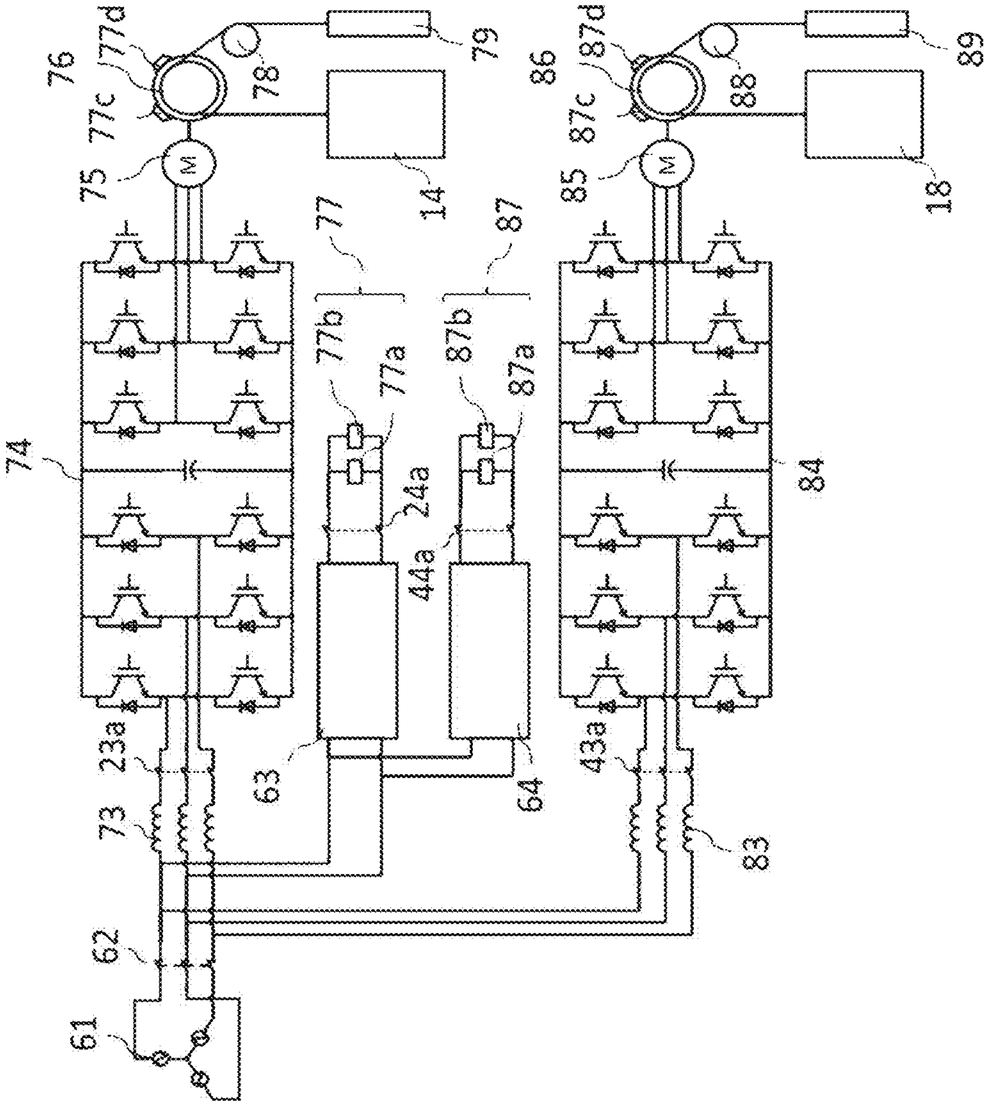
FIG. 2 shows a circuit configuration diagram of the elevator system according to Embodiment 1.
Figure 3:
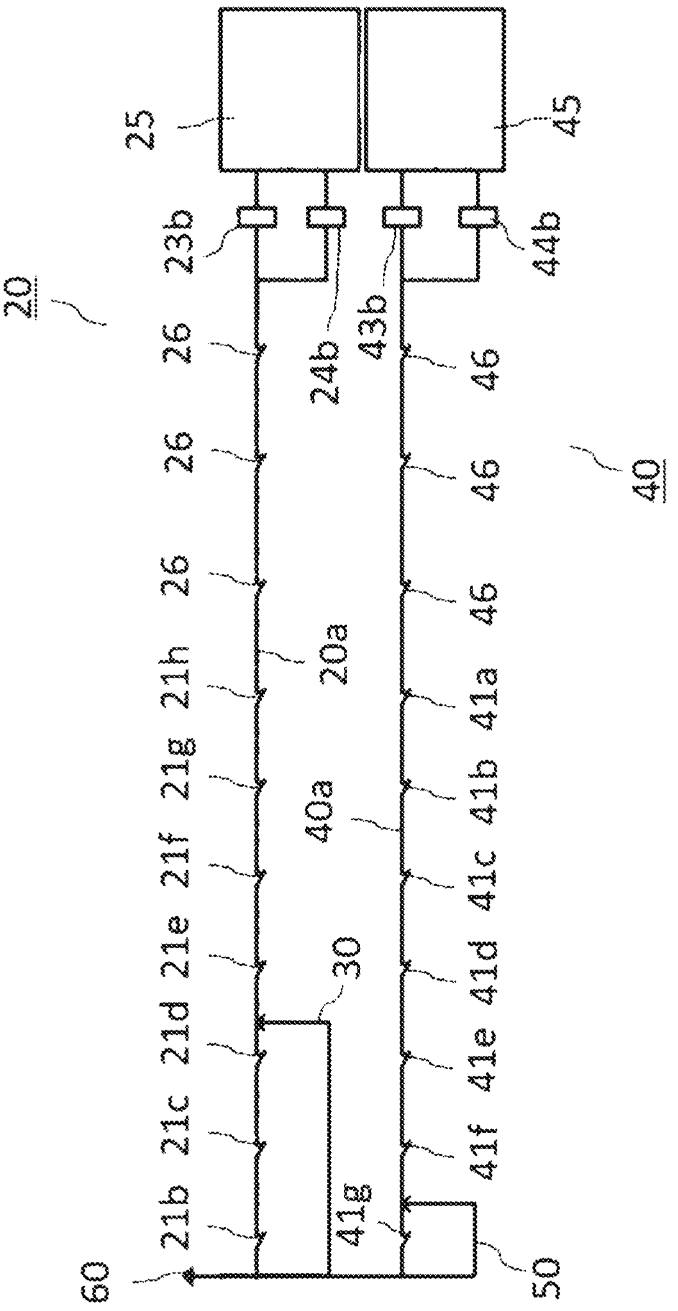
FIG. 3 shows a circuit configuration diagram of the landing-door switch circuit according to Embodiment 1.

Next, FIG. 2 is used to describe the circuit configuration of the entire elevator system according to the present embodiment. FIG. 2 shows a circuit configuration diagram of the elevator system.

The three-phase AC power supply 61 is connected to an upper-car AC reactor 73, a lower-car AC reactor 83, an upper-car hoist brake power supply circuit 63, and a lower-car hoist brake power supply circuit 64 via a power circuit breaker 62. The three-phase AC power supply 61 serves as the upper-car hoist drive power supply to drive the upper car 14 and as the lower-car hoist drive power supply to drive the lower car 18.

The upper-car AC reactor 73 is connected to an upper-car power converter 74 via the main contact 23*a* of the switching device. The upper-car power converter 74 is connected to the upper-car hoist motor 75 of an upper-car hoist 76. A rope with the upper car 14 and a counterweight 79 attached is wound around the upper-car hoist 76, which is braked by two upper-car hoist brakes 77*c* and 77*d*. This rope is also wound around a deflector sheave 78.

The lower-car AC reactor 83 is connected to a lower-car power converter 84 via the main contact 43*a* of the switching device. The lower-car power converter 84 is connected to the lower-car hoist motor 85 of a lower-car hoist 86. A rope with the lower car 18 and a counterweight 89 attached is wound around the lower-car hoist 86, which is braked by two lower-car hoist brakes 87*c* and 87*d*. This rope is also wound around a deflector sheave 88.

The upper-car hoist brake power supply circuit 63 is connected to two upper-car hoist brake coils 77*a* and 77*b* via the main contact 24*a* of the switching device. The upper-car hoist brake coil 77*a* and the upper-car hoist brake coil 77*b* are coils provided for the upper-car hoist brake 77*c* and the upper-car hoist brake 77*d*, respectively. The lower-car hoist brake power supply circuit 64 is connected to two lower-car hoist brake coils 87*a* and 87*b* via the main contact 44*a* of the switching device. The lower-car hoist brake coil 87*a* and the lower-car hoist brake coil 87*b* are coils provided for the lower-car hoist brake 87*c* and the lower-car hoist brake 87*d*, respectively.

Next, a circuit configuration of the landing-door switch circuit according to the present embodiment will be described with reference to FIG. 3. FIG. 3 shows a circuit configuration diagram of the landing-door switch circuit. FIG. 3 shows the circuit when the upper car 14 is stopped on the seventh floor and the lower car 18 is stopped on the fourth floor as shown in FIG. 1.

As described using FIG. 1, the upper-car main circuit 20*a*, the upper-car auxiliary circuit 30, the lower-car main circuit 40*a*, and the lower-car auxiliary circuit 50 are connected to the power supply 60.

The upper-car main circuit 20*a* is connected to the excitation coil 23*b* and the excitation coil 24*b*, and the upper-car landing-door switches 21 are connected in series between the power supply 60 and these excitation coils. In addition to the upper-car landing-door switches 21, a plurality of safety switches 26 are connected. For example, the safety switches 26 turn to ON state when the car door is closed and turn to OFF state when the car door is open.

The lower-car main circuit 40*a* is connected to the excitation coil 43*b* and the excitation coil 44*b*, and the lower-car landing-door switches 41 are connected in series between the power supply 60 and these excitation coils. In addition to the lower-car landing-door switches 41, a plurality of safety switches 46 are connected as in the upper-car main circuit 20*a*.

An upper-car control circuit 25 is connected to the switching devices each independently having the excitation coil 23*b* or the excitation coil 24*b*. A lower-car control circuit 45 is connected to the switching devices each independently having the excitation coil 43*b* or the excitation coil 44*b*.

The second connection unit 31 (not shown) of the upper-car auxiliary circuit 30 is electrically connected to the first connection unit 22*d* (also not shown), which is branched at a position more distant from the power supply 60 than the upper-car landing-door switch 21*d*. Similarly, the fourth connection unit 51 (not shown) of the lower-car auxiliary circuit 50 is electrically connected to the third connection unit 42*g* (also not shown), which is branched at a position more distant from the power supply 60 than the lower-car landing-door switch 41*g*.

The operation of the present embodiment is described next.

When moving the upper car 14, the upper-car control circuit 25 outputs an instruction to turn the main contact 23*a* and the main contact 24*a* to ON state. At this moment, the main contact 23*a* and the main contact 24*a* cannot turn to ON state if electric power from the power supply 60 is not supplied to the excitation coil 23*b* and the excitation coil 24*b*, respectively.

When the upper-car landing-door switches 21 and the safety switches 26 provided for the upper-car main circuit 20*a* are all in ON state, electric power is supplied to the excitation coil 23*b* and the excitation coil 24*b* from the power supply 60. On the other hand, if any one of the upper-car landing-door switches 21 and the safety switches 26 connected in series is in OFF state, the upper-car main circuit 20*a* cannot supply electric power to the excitation coil 23*b* and the excitation coil 24*b* from the power supply 60.

In this case, when the second connection unit 31 of the upper-car auxiliary circuit is connected to one of the first connection units 22, which are branched from the upper-car main circuit 20*a*, electric power of the power supply 60 is supplied from the second connection unit 31 to the first connection unit 22. Therefore, the upper-car landing-door switches 21 between the first connection unit 22 connected to the second connection unit 31 and the power supply 60, in other words, the switches 21 on the floor where the lower car 18 is stopped and the floors below that floor are bypassed by the upper-car auxiliary circuit 30. This allows electric power to be supplied from the power supply 60 to the excitation coil 23*b* and the excitation coil 24*b* even when any one of the upper-car landing-door switches 21 bypassed by the upper-car auxiliary circuit 30 turns to OFF state.

The same is true for the lower car 18.

When moving the lower car 18, the lower-car control circuit 45 outputs an instruction to turn the main contact 43*a* and the main contact 44*a* to ON state. At this moment, the main contact 43*a* and the main contact 44*a* cannot turn to ON state if electric power from the power supply 60 is not supplied to the excitation coil 43*b* and the excitation coil 44*b*, respectively.

When the lower-car landing-door switches 41 and the safety switches 46 provided for the lower-car main circuit 40*a* are all in ON state, electric power is supplied to the excitation coil 43*b* and the excitation coil 44*b* from the power supply 60. On the other hand, if any one of the lower-car landing-door switches 41 and the safety switches 46 connected in series is in OFF state, the lower-car main circuit 40*a* cannot supply electric power to the excitation coil 43*b* and the excitation coil 44*b* from the power supply 60.

In this case, when the fourth connection unit 51 of the lower-car auxiliary circuit 50 is connected to one of the third connection units 42, which are branched from the lower-car main circuit 40*a*, electric power of the power supply 60 is supplied from the fourth connection unit 51 to the third connection unit 42. Therefore, the lower-car landing-door switches 41 between the third connection unit 42 connected to the fourth connection unit 51 and the power supply 60, in other words, the switches 41 on the floor where the upper car 14 is stopped and the floors above that floor are bypassed by the lower-car auxiliary circuit 50. This allows electric power to be supplied from the power supply 60 to the excitation coil 43*b* and the excitation coil 44*b* even when any one of the lower-car landing-door switches 41 bypassed by the lower-car auxiliary circuit 50 turns to OFF state.

As described so far, according to the present embodiment, for a double-car elevator which prevents cars from traveling when a landing door is open, a landing-door switch circuit can be provided which allows one car to continue traveling even when a landing door is open on a floor to which the one car cannot travel due to the existence of the other car.

Specifically, in the present embodiment, by providing the upper car 14 and the lower car 18 with the fourth connection unit 51 of the lower-car auxiliary circuit 50 and the second connection unit 31 of the upper-car auxiliary circuit 30, respectively, the lower-car landing-door switches 41 and the upper-car landing-door switches 21 can be bypassed using one circuit for each of them.

Therefore, even when a landing door on a floor to which one car cannot travel due to the existence of the other car is opened by a professional engineer, etc., the other car can still travel. The risk of an operator accidentally falling into the hoistway is equivalent between the case, described above, where a landing door is opened on a floor to which one of the two cars is structurally prevented from traveling and the case where a car is stopped on a floor and a landing door is opened on a floor other than the floor on which the car is stopped in a general elevator that has only one car in its hoistway. Therefore, there is no need to necessarily prevent the other car from operating in such a case.

In the present embodiment, which of the lower-car landing-door switches 41 and the upper-car landing-door switches 21 are bypassed is determined depending on the locations of the upper car 14 and the lower car 18. Therefore, it is not necessary to input the information of the landing-door switch on each floor individually into a controller having a control circuit for determining the landing-door switches to be bypassed; and it is not necessary to use the controller to determine the landing-door switches to be bypassed on the basis of the locations of the cars and to output instructions for bypassing the determined landing-door switches. This eliminates the need for a receiver circuit to receive the information on the landing-door switches, the operations required for the determination, and an output circuit to output the instructions. Therefore, the landing-door switch circuit according to the present embodiment is particularly useful for an elevator system installed in a high-rise building with many floors. This is because a high-rise building requires a large amount of wiring to transmit instructions for bypassing the landing-door switches provided on the respective floors.

Note that, in the present embodiment, the upper-car landing-door switch 21 and the lower-car landing-door switch 41 are not provided on the first floor of the upper-car main circuit 20*a* and the eighth floor of the lower-car main circuit 40*a*, respectively. This is because the upper car 14 and the lower car 18 cannot travel to the first and eighth floors, respectively, and therefore the safety is not compromised even if the landing doors open.

Embodiment 2

Figure 4:
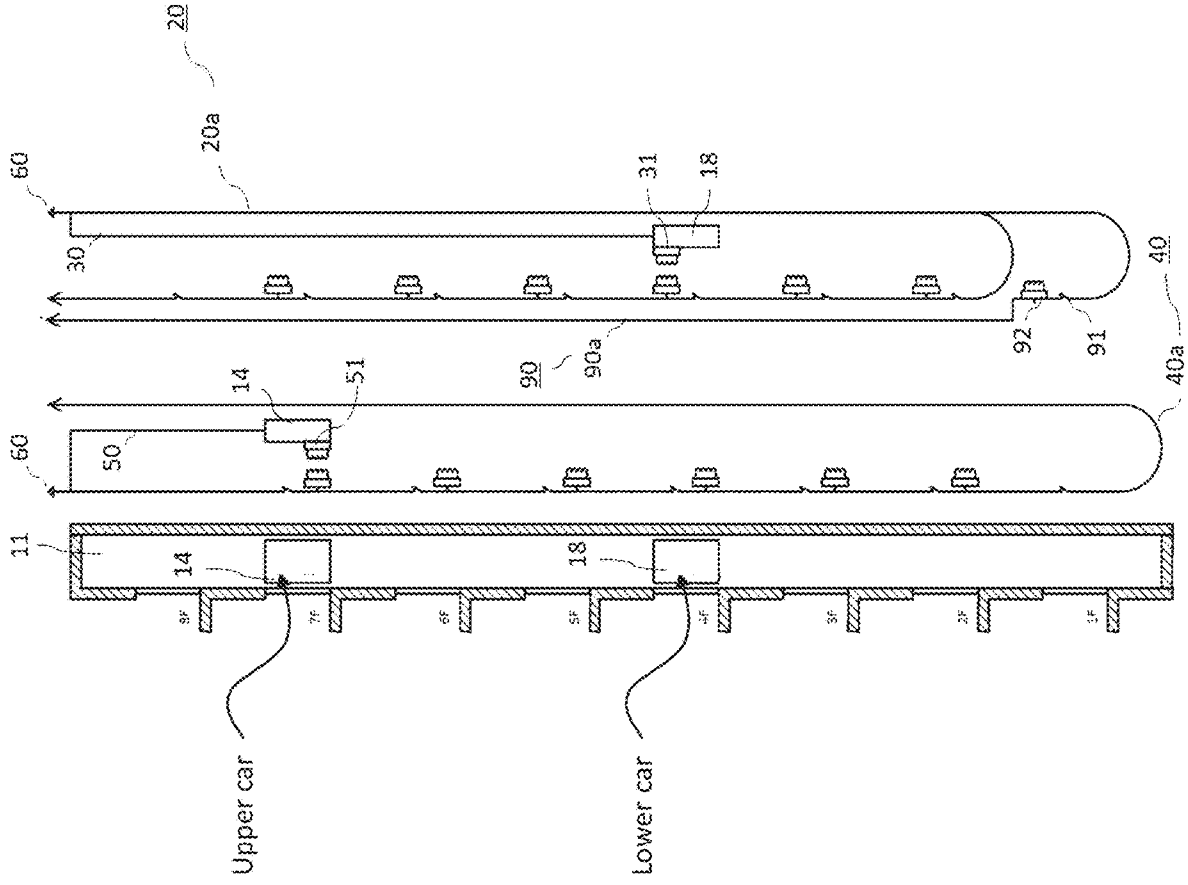
FIG. 4 shows a schematic diagram of an elevator system with a landing-door switch circuit according to Embodiment 2.

The present embodiment illustrates a landing-door switch circuit which prevents the upper car 14 and the lower car 18 from traveling when the landing door is open on the first floor, which is the lowest floor, except when the lower car 18 is stopped on the first floor. The following description focuses on the differences from Embodiment 1. First, the configuration of the present embodiment will be described using FIGS. 4 through 6. FIG. 4 shows a schematic diagram of an elevator system with the landing-door switch circuit according to the present embodiment.

The landing-door switch circuit according to the present embodiment includes a lowest-floor safety circuit 90 in addition to the upper-car safety circuit 20. Also in the present embodiment, as in Embodiment 1, the upper-car safety circuit 20 does not include the upper-car landing-door switch 21 and the first connection unit 22 on the first floor, which is the lowest floor. The lowest-floor safety circuit 90 is a circuit that includes a lowest-floor main circuit 90*a* to which an upper-car landing-door switch 91 is connected in series and a fifth connection unit 92 on the first floor, which is the lowest floor.

Figure 5:
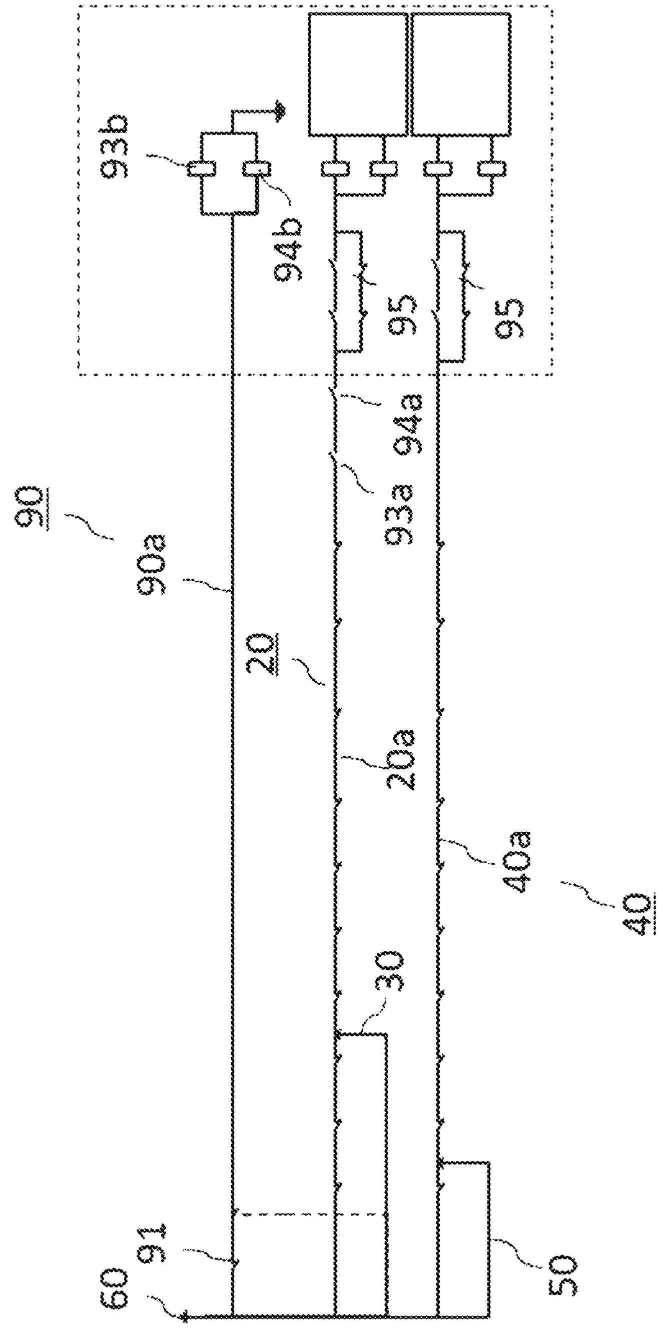
FIG. 5 shows a circuit configuration diagram of the landing-door switch circuit according to Embodiment 2.
Figure 6:
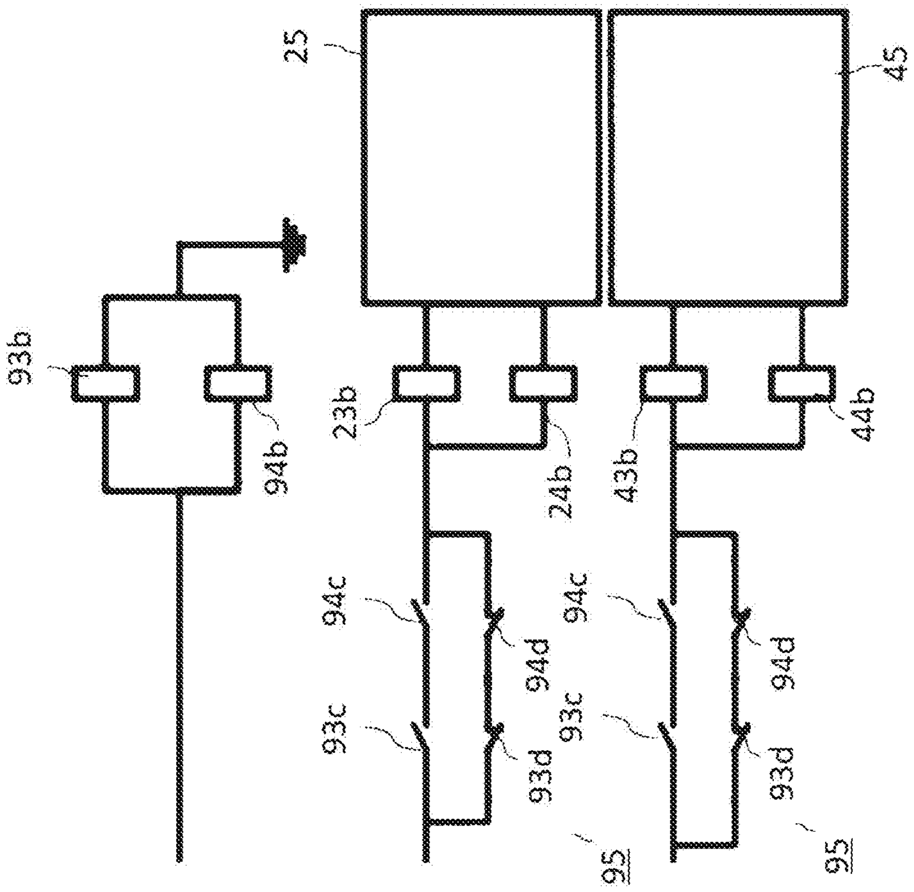
FIG. 6 shows a partially enlarged diagram of the circuit configuration of the landing-door switch circuit according to Embodiment 2.

FIG. 5 shows a circuit configuration diagram of the landing-door switch circuit according to the present embodiment. FIG. 6 shows a partially enlarged diagram of the area enclosed by the dotted line in FIG. 5.

The lowest-floor safety circuit 90 includes the lowest-floor main circuit 90*a* and the fifth connection unit 92. The lowest-floor main circuit 90*a* connects the power supply 60 with an excitation coil 93*b* and an excitation coil 94*b*, which are excitation coils of a relay contact 93*a* and a relay contact 94*a* (described below), respectively. The lowest-floor main circuit 90*a* includes the upper-car landing-door switch 91, corresponding to the landing door on the lowest floor, connected in series between the power supply and the excitation coils.

The fifth connection unit 92 is branched from the lowest-floor main circuit 90*a* correspondingly to the first floor that includes the landing where the upper-car landing-door switch 91 is provided, and is a receiver of a contactless power supply system in the present embodiment. The fifth connection unit 92 is branched from the lowest-floor main circuit 90*a* at a position more distant from the power supply than the upper-car landing-door switch 91. When the lower car 18 faces the landing of the first floor, the fifth connection unit 92 is electrically connected to the second connection unit 31 as the first connection unit 22 is.

The upper-car main circuit 20*a* of the upper-car safety circuit 20 further includes the relay contact 93*a* and the relay contact 94*a* between the power supply 60 and the excitation coils 23*b* and 24*b*. The relay contact 93*a* and the relay contact 94*a* are normally-open contacts which turn to ON state when the excitation coil 93*b* and the excitation coil 94*b* are excited, respectively.

The excitation coil 93*b* and the excitation coil 94*b* are coils for relays (for example, a relay with a forcibly guided contact according to IEC 61810-3) that are configured to mechanically prevent a normally-open contact and a normally-closed contact from turning to ON state simultaneously. In the present embodiment, contacts other than the relay contact 93*a* and the relay contact 94*a* are connected to the upper-car main circuit 20*a* and the lower-car main circuit 40*a*.

FIG. 6 shows that there are two shutdown circuits 95; one is connected in series to the upper-car main circuit 20*a* and the other is connected in series to the lower-car main circuit 40*a*, both together with the landing-door switches, etc., and that each of the shutdown circuits 95 includes two circuits connected in parallel; one includes a normally-open contact 93*c* corresponding to the relay contact 93*a* and a normally-open contact 94*c* corresponding to the relay contact 94*a*, these normally-open contacts being connected in series, and the other includes a normally-closed contact 93*d* corresponding to the relay contact 93*a* and a normally-closed contact 94*d* corresponding to the relay contact 94*a*, these normally-open contacts being connected in series.

The two normally-open contacts, namely, the relay contact 93*a* as well as the normally-open contact 93*c*, and the normally-closed contact 93*d* are mechanically configured not to turn to ON state simultaneously by means of a forced guide (not shown). Similarly, the two normally-open contacts, namely, the relay contact 94*a* as well as the normally-open contact 94*c*, and the normally-closed contact 94*d* are mechanically configured not to turn to ON state simultaneously by means of a forced guide.

Next, the operation of the present embodiment will be described.

When the landing door on the first floor is closed, the upper-car landing-door switch 91 on the first floor turns to ON state in the lowest-floor safety circuit, and electric power of the power supply 60 is supplied to excite the excitation coil 93*b* and the excitation coil 94*b*. The relay contact 93*a* and the relay contact 94*a* of the upper-car main circuit 20*a* turn to ON state by the excitation coil 93*b* and the excitation coil 94*b* being excited.

At this moment, if the other upper-car landing-door switches 21 and a safety switch 26 of the upper-car safety circuit 20 are either in ON state or bypassed by the upper-car auxiliary circuit 30, electric power of power supply 60 is supplied to the excitation coil 23*b* and the excitation coil 24*b*. Therefore, the upper-car control circuit 25 can cause the upper car 14 to travel.

On the other hand, in the case where the landing door on the first floor is open and the fifth connection unit 92 and the second connection unit 31 are not connected, electric power of the power supply 60 is not supplied to the excitation coil 93*b* and the excitation coil 94*b* to excite them. Therefore, the relay contact 93*a* and the relay contact 94*a* of the upper-car main circuit 20*a* turn to OFF state. Therefore, electric power of the power supply 60 is not supplied to the excitation coil 23*b* and the excitation coil 24*b*, regardless of the states of the other switches provided in the upper-car main circuit 20*a*. Therefore, the upper-car control circuit 25 cannot cause the upper car 14 to travel.

Additionally, even when the landing door on the first floor is open, if the fifth connection unit 92 and the second connection unit 31 are connected, in other words, when the lower car 18 faces the landing on the first floor, the upper-car landing-door switch 91 is bypassed by the upper-car auxiliary circuit 30. Therefore, electric power from the power supply 60 is supplied to the excitation coil 93*b* and the excitation coil 94*b* to excite them. Thus, the relay contact 93*a* and the relay contact 94*a* turn to ON state as in the case where the landing door on the first floor is closed, so that the upper-car control circuit 25 can cause the upper car 14 to travel.

Furthermore, if a fault causes the relay contact 93*a* or the relay contact 94*a* to be stuck to ON state, the shutdown circuit 95 cuts off electric power from the power supply 60 in the upper-car main circuit 20*a* and the lower-car auxiliary circuit 50. Therefore, the excitation coil 23*b*, the excitation coil 24*b*, the excitation coil 43*b* and the excitation coil 44*b* are not excited, and thus the upper car 14 and the lower car 18 are stopped.

As described above, according to the present embodiment, when the landing door on the first floor, which is the lowest floor, is open, except when the lower car 18 is stopped on the first floor, the upper car 14 and the lower car 18 can be prevented from traveling.

On the lowest floor of the hoistway 11, the operator may open the landing door to work inside the hoistway 11. In such a case, the counterweight 79 could collide with the operator even on the lowest floor where the upper car 14 cannot exist. Therefore, in a case where the lower car 18 is not stopped on the lowest floor, it is advantageous to prevent the upper car 14 from traveling when the landing door on the lowest floor is opened.

Embodiment 3

Figure 7:
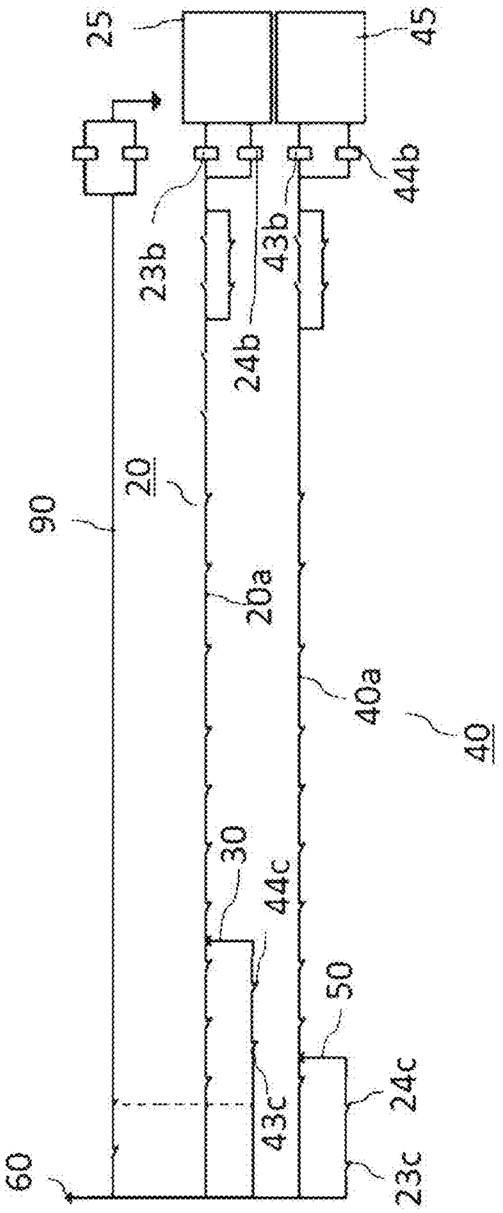
FIG. 7 shows a circuit configuration diagram of a landing-door switch circuit according to Embodiment 3.

The present embodiment illustrates a landing-door switch circuit which, when one car is traveling and when it temporarily faces one of the landings, prevents the other car from traveling. The following description focuses on the differences from Embodiment 2. FIG. 7 shows a circuit configuration diagram of the landing-door switch circuit according to the present embodiment.

In the present embodiment, the upper-car auxiliary circuit 30 includes a normally-closed auxiliary contact 43*c* and a normally-closed auxiliary contact 44*c* for the respective lower-car power supply switching devices having the main contact 43*a* and the main contact 44*a*, respectively. The normally-closed auxiliary contact 43*c* and the normally-closed auxiliary contact 44*c* are excited by the excitation coil 43*b* and the excitation coil 44*b*, respectively.

The normally-closed auxiliary contact 43*c* and the normally-closed auxiliary contact 44*c* are contacts which, in contrast to the main contact 43*a* and the main contact 44*a*, switch from ON state to OFF state when the excitation coil 43*b* and the excitation coil 44*b* are supplied with electric power from the power supply 60 and an instruction to turn the main contact 43*a* and the main contact 44*a* to ON state is outputted from the lower-car control circuit 45.

The lower-car auxiliary circuit 50 also includes a normally-closed auxiliary contact 23*c* and a normally-closed auxiliary contact 24*c* for the respective upper-car power supply switching devices having the main contact 23*a* and the main contact 24*a*, respectively. The normally-closed auxiliary contact 23*c* and the normally-closed auxiliary contact 24*c* are excited by the excitation coil 23*b* and the excitation coil 24*b*, respectively.

The normally-closed auxiliary contact 23*c* and the normally-closed auxiliary contact 24*c* are contacts which, in contrast to the main contact 23*a* and the main contact 24*a*, switch from ON state to OFF state when the excitation coil 23*b* and the excitation coil 24*b* are supplied with electric power from the power supply 60 and an instruction to turn the main contact 23*a* and the main contact 24*a* to ON state is outputted from the upper-car control circuit 25.

Next, the operation of the present embodiment will be described.

When the lower car 18 is traveling, in other words, when the main contact 43*a* and the main contact 44*a* are in ON state, the normally-closed auxiliary contact 43*c* and the normally-closed auxiliary contact 44*c* turn to OFF state. Therefore, the upper-car auxiliary circuit 30 cannot supply electric power of the power supply 60 from the second connection unit 31 to the first connection unit 22 and cannot bypass the upper-car landing-door switches 21.

Therefore, even when the lower car 18 faces one of the landings and the first connection unit 22 and the second connection unit 31 are temporarily electrically connected, the upper car 14 is prevented from traveling when the lower car 18 is traveling and a landing door is open on the floor where the lower car 18 exists or the floors below that floor. This is because the electric power supply to the excitation coil 23*b* and the excitation coil 24*b* in the upper-car main circuit 20*a* is cut off by the upper-car landing-door switch 21 of the landing door which is open, and thus the electric power supply to the excitation coil 23*b* and the excitation coil 24*b* in the upper-car auxiliary circuit 30 is cut off by the normally-closed auxiliary contact 23*c* and the normally-closed auxiliary contact 24*c*.

Similarly, when the upper car 14 is traveling, in other words, when the main contact 23*a* and the main contact 24 a are in ON state, the normally-closed auxiliary contact 23*c* and the normally-closed auxiliary contact 24*c* turn to OFF state. Therefore, the lower-car auxiliary circuit 50 cannot supply electric power of the power supply 60 from the fourth connection unit 51 to the third connection unit 42 and cannot bypass the lower-car landing-door switches 41.

Therefore, even when the upper car 14 faces one of the landings and the third connection unit 42 and the fourth connection unit 51 are temporarily electrically connected, the lower car 18 is prevented from traveling when the upper car 14 is traveling and a landing door is open on the floor where the upper car 14 exists or the floors above that floor. This is because the electric power supply to the excitation coil 43*b* and the excitation coil 44*b* in the lower-car main circuit 40*a* is cut off by the lower-car landing-door switch 41 of the landing door which is open, and thus the electric power supply to the excitation coil 43*b* and the excitation coil 44*b* in the lower-car auxiliary circuit 40*a* is cut off by the normally-closed auxiliary contact 43*c* and the normally-closed auxiliary contact 44*c*.

According to the present embodiment, when one car is traveling and when it temporarily faces one of the landings, the other car can be prevented from traveling.

Although the embodiments have been described above, the present disclosure is not limited to these embodiments, and their variations are shown below.

In the embodiments, the upper-car auxiliary circuit 30 and the lower-car auxiliary circuit 50 are each connected at one end to the power supply 60. However, as long as the aforementioned problem can be solved, these circuits may be independently connected at one end to the excitation coil 23*b* and the excitation coil 24*b*, and to the excitation coil 43*b* and the excitation coil 44*b*, instead of to the power supply 60.

Note that in this case, in the upper-car main circuit 20*a* and the lower-car main circuit 40*a*, the order of the landing-door switches and the order of the first connection units 22

(or the third connection units 42) should be reversed in the distance from the power supply 60.

For example, in the case where the upper-car auxiliary circuit 30 is connected to the excitation coil 23*b* and the excitation coil 24*b*, the order of the upper-car landing-door switches 21 and the order of the first connection units 22 in the upper-car main circuit 20*a* must be reversed to bypass, as in the embodiments, the upper-car landing-door switches 21 on the floor where the lower car 18 exists and the floors below that floor.

Specifically, in the upper-car main circuit 20*a*, in order of the distance from the power supply 60, in other words, from the closest to the excitation coil 23*b* and the excitation coil 24*b*, the upper-car landing-door switch 21*b* on the second floor, the upper-car landing-door switch 21*c* on the third floor, the upper-car landing-door switch 21*d* on the fourth floor, the upper-car landing-door switch 21*e* on the fifth floor, the upper-car landing-door switch 21*f* on the sixth floor, the upper-car landing-door switch 21*g* on the seventh floor, and the upper-car landing-door switch 21*h* on the eighth floor are connected in series. The first connection units 22 are branched from the upper-car main circuit 20*a* on the side closer to the power supply 60 than the respective upper-car landing-door switches 21 provided individually at the landings. The safety switch 26 is provided on the side closer to the power supply 60 than the upper-car landing-door switch 21*b* on the second floor.

In the embodiments, the first connection unit 22, the second connection unit 31, the third connection unit 42, the fourth connection unit 51, and the fifth connection unit 92 are receivers or transmitters of the contactless power supply systems. However, as long as the aforementioned problem can be solved, their connection may be mechanical.

The shutdown circuits 95 provided for the upper-car auxiliary circuit 30 and the lower-car auxiliary circuit 50 in Embodiments 2 and 3 may be omitted.

DESCRIPTION OF SYMBOLS

- 11 . . . hoistway,
- 14 . . . upper car,
- 18 . . . lower car,
- 20 . . . upper-car safety circuit,
- 20*a* . . . upper-car main circuit,
- 21, 21*b*, 21*c*, 21*d*, 21*e*, 21*f*, 21*g*, 21*h* . . . upper-car landing-door switch,
- 22, 22*b*, 22*c*, 22*d*, 22*e*, 22*f*, 22*g* first connection unit,
- 23*a* . . . main contact,
- 23*b* . . . excitation coil,
- 23*c* . . . normally-closed auxiliary contact,
- 24*a* . . . main contact,
- 24*b* . . . excitation coil,
- 24*c* . . . normally-closed auxiliary contact,
- 25 . . . upper-car control circuit,
- 26 . . . safety switch,
- 30 . . . upper-car auxiliary circuit,
- 31 . . . second connection unit,
- 40 . . . lower-car safety circuit,
- 40*a* . . . lower-car main circuit,
- 41, 41*a*, 41*b*, 41*c*, 41*d*, 41*e*, 41*f*, 41*g* . . . lower-car landing-door switch,
- 42, 42*b*, 42*c*, 42*d*, 42*e*, 42*f*, 42*g* . . . third connection unit,
- 43*a* . . . main contact,
- 43*b* . . . excitation coil,
- 43*c* . . . normally-closed auxiliary contact,
- 44*a* . . . main contact,
- 44*b* . . . excitation coil,
- 44*c* . . . normally-closed auxiliary contact,
- 45 . . . lower-car control circuit,
- 46 . . . safety switch,
- 50 . . . lower-car auxiliary circuit,
- 51 . . . fourth connection unit,
- 60 . . . power supply,
- 61 . . . three-phase AC power supply,
- 62 . . . power circuit breaker,
- 63 . . . upper-car hoist brake power supply circuit,
- 64 . . . lower-car hoist brake power supply circuit,
- 73 . . . upper-car AC reactor,
- 74 . . . upper-car power converter,
- 75 . . . upper-car hoist motor,
- 76 . . . upper-car hoist,
- 77, 77*a*, 77*b* . . . upper-car hoist brake coil,
- 77*c*, 77*d* . . . upper-car hoist brake,
- 78 . . . deflector sheave,
- 79 . . . counterweight,
- 83 . . . lower-car AC reactor,
- 84 . . . lower-car power converter,
- 85 . . . lower-car hoist motor,
- 86 . . . lower-car hoist,
- 87, 87*a*, 88*b* . . . lower-car hoist brake coil,
- 87*c*, 87*d* . . . lower-car hoist brake,
- 88 . . . deflector sheave,
- 89 . . . counterweight,
- 90 . . . lowest-floor safety circuit,
- 90*a* . . . lowest-floor main circuit,
- 91 . . . upper-car landing-door switch,
- 92 . . . fifth connection unit,
- 93*a* . . . relay contact,
- 93*b* . . . excitation coil,
- 93*c* . . . normally-open contact,
- 93*d* . . . normally-closed contact,
- 94*a* . . . relay contact,
- 94*b* . . . excitation coil,
- 94*c* . . . normally-open contact,
- 94*d* . . . normally-closed contact,
- 95 . . . shutdown circuit

The invention claimed is:

1. A landing-door switch circuit to be applied for an elevator system comprising an upper car and a lower car in a single hoistway and a plurality of landing doors for passage between the upper car or the lower car and landings provided for respective floors, the landing-door switch circuit comprising:

an upper-car safety circuit comprising an upper-car main circuit connecting a power supply and an upper-car coil which is an excitation coil provided for a switching device of an upper-car power supply for driving the upper car, and comprising a plurality of landing-door switches corresponding to the respective landings, connected in series between the upper-car coil and the power supply, the landing-door switches each turning to ON state when a landing door is in a closed state and turning to OFF state when the landing door is in an open state, and first connection units branched from the upper-car main circuit correspondingly to the respective landings where the landing-door switches are provided;

an upper-car auxiliary circuit connected at one end to the upper-car coil or the power supply and comprising at the other end a second connection unit provided for the lower car to be electrically connected to one of the first connection units when the lower car faces one of the landings, wherein the upper-car auxiliary circuit bypasses the landing-door switches on the floor where the lower car exists and the floors below that floor when the one of the first connection units and the second connection unit are electrically connected;

a lower-car safety circuit comprising a lower-car main circuit connecting the power supply and a lower-car coil which is an excitation coil provided for a switching device of a lower-car power supply for driving the lower car, and comprising a plurality of landing-door switches corresponding to the respective landings, connected in series between the lower-car coil and the power supply, and third connection units branched from the lower-car main circuit correspondingly to the respective landings where the landing-door switches are provided; and a lower-car auxiliary circuit connected at one end to the lower-car coil or the power supply and comprising at the other end a fourth connection unit provided for the upper car to be electrically connected to one of the third connection units when the upper car faces one of the landings, wherein the lower-car auxiliary circuit bypasses the landing-door switches on the floor where the upper car exists and the floors above that floor when the one of the third connection units and the fourth connection unit are electrically connected.

2. The landing-door switch circuit according to claim 1, wherein the upper-car main circuit does not comprise a landing-door switch connected in series correspondingly to a landing of a lowest floor and comprises a relay contact between the upper-car coil and the power supply, wherein the landing-door switch circuit further comprises a lowest-floor safety circuit comprising:

a lowest-floor main circuit connecting the power supply and a lowest floor coil which is an excitation coil of the relay contact and comprising the landing-door switch corresponding to the landing of the lowest floor connected in series; and a fifth connection unit branched from the lowest-floor main circuit correspondingly to the landing of the lowest floor, wherein the second connection unit is to be electrically connected to the fifth connection unit, and wherein the upper-car auxiliary circuit bypasses the landing-door switch provided at the landing of the lowest floor when the fifth connection unit and the second connection unit are electrically connected.

3. The landing-door switch circuit according to claim 1, wherein the upper-car auxiliary circuit comprises a normally-closed auxiliary contact of the switching device of the lower-car power supply, and the lower-car auxiliary circuit comprises a normally-closed auxiliary contact of the switching device of the upper-car power supply.

4. The landing-door switch circuit according to claim 2, wherein the upper-car auxiliary circuit comprises a normally-closed auxiliary contact of the switching device of the lower-car power supply, and the lower-car auxiliary circuit comprises a normally-closed auxiliary contact of the switching device of the upper-car power supply.

5. The landing-door switch circuit according to claim 1, wherein one of each of the first connection units and the second connection unit is a receiver of a contactless power supply system and the other is a transmitter of the contactless power supply system, and one of each of the third connection units and the fourth connection unit is a receiver of a contactless power supply system and the other is a transmitter of the contactless power supply system.

6. The landing-door switch circuit according to claim 2, wherein one of each of the first connection units and the second connection unit is a receiver of a contactless power supply system and the other is a transmitter of the contactless power supply system, and one of each of the third connection units and the fourth connection unit is a receiver of a contactless power supply system and the other is a transmitter of the contactless power supply system.

7. The landing-door switch circuit according to claim 3, wherein one of each of the first connection units and the second connection unit is a receiver of a contactless power supply system and the other is a transmitter of the contactless power supply system, and one of each of the third connection units and the fourth connection unit is a receiver of a contactless power supply system and the other is a transmitter of the contactless power supply system.

8. The landing-door switch circuit according to claim 4, wherein one of each of the first connection units and the second connection unit is a receiver of a contactless power supply system and the other is a transmitter of the contactless power supply system, and one of each of the third connection units and the fourth connection unit is a receiver of a contactless power supply system and the other is a transmitter of the contactless power supply system.

* * * * *